Patented Sept. 1, 1931

1,821,256

UNITED STATES PATENT OFFICE

RAINALD BRIGHTMAN AND PERCY CHORLEY, OF BLACKLEY, MANCHESTER, ENGLAND, ASSIGNORS TO BRITISH DYESTUFFS CORPORATION LIMITED, OF MANCHESTER, ENGLAND

NEW AZO DYESTUFFS AND THEIR APPLICATION

No Drawing. Application filed April 16, 1928, Serial No. 270,572, and in Great Britain April 22, 1927.

According to this invention we obtain new and valuable azo dyestuffs by combining a tetrazotized 4:4'-diamino diphenyl mono- di- or tri-sulphide with two molecules of suitable end components of which at least one is or contains an amino naphthol sulphonic acid including in this term the N-substituted derivatives thereof, directly coupled with the diamino diphenyl sulphide residue. The other coupling component may be any of the known coupling components and either coupling component may contain an azo group. These dyestuffs are represented by the general formula

wherein $R_1$ represents a coupling component, $R_2$ represents a coupled amino naphthol sulphonic acid and $x$ is an interger greater than 0 and less than 4.

These dyestuffs may be also prepared by another method than the method of the present application indicated above; namely by the method set forth in the application of one of us, Rainald Brightman, Ser. No. 262,048. In that application there is disclosed a process which comprises combining a diazotized 4-nitro-4'-amino diphenyl sulphide with salicylic acid, reducing the nitro group of the resultant dyestuff by means of sodium sulphide, diazotizing the amino body thus obtained and combining it with an aminonaphthol sulphonic acid. The dyestuffs produced by such a method are of the same general type as herein disclosed.

The present invention is directed to the processes of making these dyestuffs in which a tetrazotized 4:4'-diamino-diphenyl mono- di- or tri-sulphide is combined with one molecular proportion of an amino-naphthol sulphonic acid including in this term the N-substituted derivatives thereof, and one molecular proportion of any coupling component.

According to the components used and to the conditions of coupling, we obtain dyestuffs which are valuable for dyeing animal or vegetable fibres or for dyeing regenerated cellulose silks. Certain of the dyestuffs we obtain give dyeings on wool which are fast to milling and some have the property of giving even dyeings on regenerated cellulose silks. Particularly valuable products are obtained when the 4:4'-diamino diphenyl sulphide is combined with at least one molecule of 2-amino-8-naphthol-6-sulphonic acid or an N-substituted derivative thereof.

Our advantageous dyes include those formed by tetrazotizing a 4:4'-diamino diphenyl mono-, di- or tri-sulphide and coupling with an amino-naphthol sulphonic acid of the type

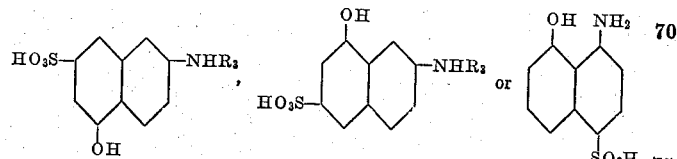

wherein $R_3$ represents hydrogen, an acyl group or an aryl group. Either or both of the coupling components can be selected from amino naphthol sulphonic acids of the above type. By the term "aryl group" I mean a benzene or naphthalene residue which may be further substituted. This relatively unessential part of the molecule can be varied widely without substantially altering the important properties of our compounds.

The 4:4'-diamino diphenyl sulphides used by us are crystalline substances of known structure and possess melting points given in the literature, viz., 4:4'-diamino diphenyl sulphide, m. p. 108–109° C. (Kehrmann and Bauer, Berichte, 1896, 29, 2362); 4:4'-diamino diphenyl disulphide, m. p. 78° C. (Schmidt, Berichte, 1878, 11, 1172) and 4:4'-diamino diphenyl trisulphide, m. p. 122° C. (Hodgson, J. Chem. Soc. 1925, 127, 443). They are not the same compounds as the so-called "thio-bases" obtained by the action of sulphur on aromatic amines, but have different melting points and other properties. The following examples illustrate the invention without limiting it, the parts being by weight.

*Example 1.*—216 parts of 4:4′-diamino diphenyl sulphide are dissolved in water and 500 parts of 36 per cent hydrochloric acid. The solution is stirred and cooled with ice and tetrazotized by the gradual addition of 138 parts of sodium nitrite. The tetrazo solution thus obtained is run into a well-stirred cold solution of 322 parts of the sodium salt of 1-amino-8-naphthol-4-sulphonic acid containing 400 parts of soda ash. The mixture is stirred and maintained cold until coupling is complete when it is heated up and the dyestuff isolated by the addition of common salt. It forms a dark powder which is soluble in sulphuric acid to Prussian blue colored solutions, and in water to violet solutions. It dyes viscose silk a reddish-violet shade, and wool a violet shade.

*Example 2.*—216 parts of 4:4′-diamino diphenyl sulphide are tetrazotized with 138 parts of sodium nitrite and 500 parts of 36 per cent hydrochloric acid and the tetrazo solution is allowed to run into a solution of 630 parts of 2-phenyl amino-5-naphthol-7-sulphonic acid containing 400 parts of sodium carbonate. After stirring until coupling is complete, the mixture is heated up and the dyestuff isolated by the addition of common salt. It forms a dark powder, which is soluble in sulphuric acid to navy blue colored solutions, and in water to red solutions. It dyes viscose silk in bluish-red shades.

*Example 3.*—216 parts of 4:4′-diamino diphenyl sulphide are tetrazotized with 138 parts of sodium nitrite and 500 parts of 36 per cent hydrochloric acid and the solution of tetrazo compound is stirred into a solution containing 138 parts of salicylic acid, 40 parts of sodium hydroxide and 400 parts of sodium carbonate. The mixture is stirred until coupling is complete when a solution of 337 parts of the sodium salt of 2-phenylamino-8-naphthol-6-sulphonic acid is added. Stirring is continued until combination is complete, when the mixture is heated up and the dyestuff isolated by the addition of common salt. It forms a dark powder which is soluble in sulphuric acid to violet-blue colored solutions, and in water to brown solutions, and which dyes viscose silk a brown shade and wool in brown shades, fast to milling. The dye is identical with the dyestuff prepared from 4-nitro-4′-amino diphenyl sulphide as described in Example 5 of our co-pending application Serial No. 262,048. If in place of the 2-phenyl amino-8-naphthol-6-sulphonic acid in the above example, we use a solution of 239 parts of 2-amino-8-naphthol-6-sulphonic acid, we obtain a dyestuff giving red-brown dyeings on viscose silk.

*Example 4.*—To a solution of 138 parts of salicylic acid in 40 parts of sodium hydroxide and 400 parts of sodium carbonate there is added the tetrazo solution obtained from 216 parts of 4:4′-diamino diphenyl sulphide and 138 parts of sodium nitrite in the usual way. The mixture is kept cold and stirred until coupling is complete when there is added a neutral solution of the amino-azo compound obtained by combining 138 parts of diazotized of p-nitroaniline with 319 parts of 1-amino-8-naphthol-3:6-disulphonic acid in mineral acid solution in the known way. The mixture is maintained alkaline and stirred until coupling is complete when it is heated up and the dyestuff isolated by the addition of common salt. It forms a dark lustrous powder which is soluble in sulphuric acid to dull violet-grey colored solutions, and in water to green solutions, and which dyes viscose silk a dark green shade. If in place of 216 parts of 4:4′-diaminodiphenyl sulphide there are used 280 parts of 4:4′-diamino-diphenyl trisulphide, we obtain a dyestuff giving bright bluish-green shades on viscose silk.

*Example 5.*—280 parts of 4:4′-diamino diphenyl trisulphide are tetrazotized in the presence of ice with 138 parts of sodium nitrite and 500 parts of 36 per cent hydrochloric acid. The tetrazo-compound partly separates and the yellow suspension is run into a solution of 138 parts of salicylic acid in 40 parts of sodium hydroxide and 400 parts of sodium carbonate. After stirring until coupling is complete there is added a neutral solution of 239 parts of 2-amino-5-naphthol-7-sulphonic acid. The mixture is stirred until coupling is complete when it is heated up and the dyestuff precipitated by the addition of common salt. It forms a reddish-brown powder which is soluble in sulphuric acid to violet colored solutions; in water to orange-red solutions. It dies viscose silk an orange shade.

*Example 6.*—216 parts of 4:4′-diamino diphenyl sulphide are tetrazotized and combined with 138 parts of salicylic acid in alkaline (sodium carbonate) solution. After stirring about half an hour a solution containing 315 parts of 2-phenylamino-5-naphthol-7-sulphonic acid is added and the mixture maintained alkaline and stirred until coupling is complete. It is then heated up and the dyestuff isolated by the addition of common salt. It forms a reddish-brown powder giving a violet-blue colored solution in concentrated sulphuric acid turning redder and ultimately affording a reddish-brown precipitate on dilution. It is soluble in water giving a brown colored solution substantially unchanged on addition of alkali and yielding a reddish-brown precipitate on addition of mineral acids. It dyes viscose silk a red shade.

*Example 7.*—216 parts of 4:4′-diamino diphenyl sulphide are tetrazotized in the usual way and to the solution of tetrazo compound there is added a neutral solution of 254 parts of 1:4'-sulpho phenyl-3-methyl-5-pyrazolone. After stirring for half an hour a solution of 239 parts of 2-amino-8-naphthol-6-sulphonic acid and 500 parts of sodium carbonate is added and stirring continued until coupling is complete. The mixture is then heated up and the dyestuff isolated by the addition of common salt. It forms a black powder, giving a navy blue colored solution in concentrated sulphuric acid, turning crimson red on dilution and affording ultimately a reddish-brown precipitate. It is soluble in water to a brown colored solution which is substantially unchanged on addition of alkali and affords a reddish precipitate on addition of mineral acids. It dyes viscose silk a yellowish-brown and wool a brown shade, fast to milling.

*Example 8.*—216 parts of 4:4'-diamino diphenyl sulphide are tetrazotized in the usual way and to the solution is added, while stirring, a neutral solution of 239 parts of 2-amino-8-naphthol-6-sulphonic acid. After coupling for about one hour, the acid mixture is made alkaline by the addition of 500 parts of sodium carbonate and a solution of 315 parts of 2-phenyl amino-8-naphthol-6-sulphonic acid is run in. Stirring is continued until coupling is complete when the mixture is heated up and the dyestuff isolated by the addition of common salt. It forms a greyish powder giving a deep blue colored solution in concentrated sulphuric acid turning to violet on dilution and affording ultimately a violet-brown precipitate. It is soluble in water to a reddish-brown colored solution substantially unchanged on addition of alkali and yielding a violet-brown precipitate on addition of mineral acids. It dies viscose silk a magenta and wool a maroon shade, fast to milling.

*Example 9.*—216 parts of 4:4'-diamino diphenyl sulphide are tetrazotized in the usual way and to the solution of tetrazo compound is added a solution of 478 parts of 2-amino-8-naphthol-6-sulphonic acid and 450 parts of sodium acetate crystals. The mixture is stirred until coupling is complete, when it is made alkaline, heated up and the dyestuff isolated by the addition of common salt. It forms a black powder soluble in concentrated sulphuric acid giving a navy blue colored solution which turns violet and ultimately yields a bluish red precipitate on dilution. It is soluble in water to reddish blue colored solutions, substantially unchanged on addition of alkali and yielding a bluish red precipitate on addition of mineral acids. It dyes viscose silk a violet-brown and wool a maroon shade, fast to milling.

*Example 10.*—280 parts of 4:4'-diamino diphenyl trisulphide are tetrazotized in the usual way with 138 parts of sodium nitrite. To the suspension of tetrazo compound there is added with stirring a neutral solution containing 478 parts of 2-amino-8-naphthol-6-sulphonic acid. Stirring is continued until coupling is complete, when the mixture is made alkaline, heated up and the dyestuff is isolated by the addition of common salt. The dyestuff is a greyish-black powder soluble in concentrated sulphuric acid giving a blue colour which turns violet and ultimately yields a red-brown precipitate on dilution. It is soluble in water to brownish-red solutions, substantially unchanged on addition of alkali and yielding a red-brown precipitate on addition of mineral acids. It dyes viscose silk a maroon shade and wool a bordeaux shade, fast to milling.

The following table illustrates further the range of shades obtainable by varying the components:

| Diamine | First coupling component | Second coupling component | Shade on viscose silk |
|---|---|---|---|
| 4:4'-diamino-diphenyl monosulphide. | 2-amino-5-naphthol-7-sulphonic acid | 2-amino-5-naphthol-7-sulphonic acid | Scarlet. |
| Do. | 2-acetamino-8-naphthol-6-sulphonic acid | 2-acetamino-8-naphthol-6-sulphonic acid | Bluish-red. |
| Do. | 2-amino-5-naphthol-7-sulphonic acid | 2-benzoylamino-8-naphthol-6-sulphonic acid | Do. |
| Do. | 1-(2':5'-dichloro-4-sulphophenyl)-3-methyl-5-pyrazolone (acid coupled). | 2-phenylamino-8-naphthol-6-sulphonic acid | Yellowish-brown. |
| Do. | 1-phenyl-3-methyl-5-pyrazolone (acid coupled). | 2-amino-5-naphthol-7-sulphonic acid | Scarlet. |
| Do. | 1-(4'-sulphophenyl)-3-methyl-5-pyrazolone. | 2-amino-8-naphthol-6-sulphonic acid (acid coupled) | Orange-red. |
| Do. | do | 2-phenylamino-8-naphthol-6-sulphonic acid | Brown. |
| Do. | Salicylic acid | 2-acetamino-8-naphthol-6-sulphonic acid | Scarlet. |
| Do. | do | 2-amino-8-naphthol-6-sulphonic acid (acid coupled) | Do. |
| Do. | 2-amino-8-naphthol-6-sulphonic acid | 2-(2':4'-dinitrophenyl-amino)-8-napthol-6-sulphonic acid. | Reddish-brown. |
| 4:4'-diamino-diphenyl disulphide. | do | 2-amino-8-naphthol-6-sulphonic acid | Violet-brown. |
| Do. | 2-amino-5-naphthol-7-sulphonic acid | 2-amino-5-napthol-7-sulphonic acid | Scarlet. |
| 4:4'-diamino-diphenyl tri-sulphide. | do | do | Do. |
| Do. | Salicylic acid | 2-amino-8-naphthol-6-sulphonic acid (alkaline) | Reddish-brown. |
| Do. | do | 2-acetamino-8-naphthol-6-sulphonic acid | Yellowish-red. |
| Do. | do | 2-m-xylylamino-8-naphthol-6-sulphonic acid | Brown. |
| Do. | 1-phenyl-3-methyl-5-pyrazolone (acid coupled) | 8-hydroxy-2-naphthylglycine-6-sulphonic acid. | Light brown. |
| Do. | 1-(4'-sulpho phenyl)-3-methyl-5-pyrazolone. | 2-amino-8-naphthol-6-sulphonic acid | Yellow. |
| 4:4'-diamino-diphenyl sulphide. | 1-phenyl-3-methyl-5-pyrazolone | 8-hydroxy-2-naphthylglycine-6-sulphonic acid. | Brown. |

What we claim and desire to secure by Letters Patent is:—

1. The process for the manufacture of new azo dyes which comprises tetrazotizing a diamine of the formula

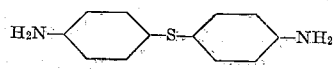

and coupling the tetrazo compound so produced with two molecular proportions of an amino naphthol sulphonic acid.

2. New azo dyes having the probable general formula

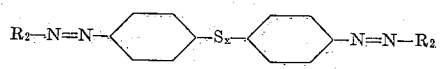

wherein $x$ is an integer greater than 0 and less than 4 and $R_2$ represents an amino naphthol sulphonic acid, the said dyes being soluble in concentrated sulphuric acid and in water and dyeing viscose silk.

3. New azo dyes having the probable general formula

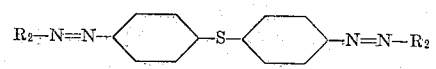

wherein $R_2$ represents an aminonaphthol sulphonic acid, the said dyes being soluble in concentrated sulphuric acid and in water and dyeing viscose silk.

4. In the manufacture of new azo dyes, the process which comprises diazotizing a diamine of the formula

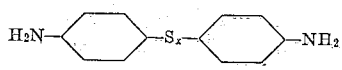

wherein $x$ is an integer greater than 0 and less than 4, and coupling the tetrazo compound so produced with one molecular proportion of 2-amino-5-naphthol-7-sulphonic acid and one molecular proportion of an amino naphthol-sulphonic acid selected from a class consisting of

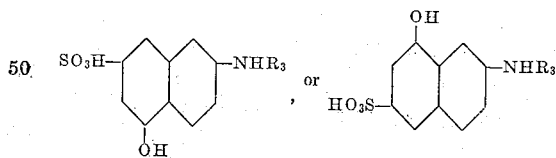

wherein $R_3$ represents hydrogen, an acyl group, or a monocyclic aryl group.

5. In the manufacture of new azo dyes, the process which comprises diazotizing a diamine of the formula

and coupling the tetrazo compound so produced with one molecular proportion of 2-amino-5-naphthol-7-sulphonic acid and one molecular proportion of an amino naphthol sulphonic acid of the type

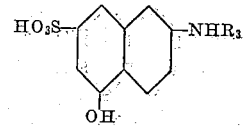

wherein $R_3$ represents hydrogen, an acyl group, or a monocyclic aryl group.

6. New azo dyes having the probable general formula

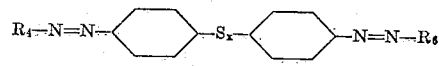

wherein $x$ is an integer greater than 0 and less than 4, $R_4$ represents a coupled 2-amino-5-naphthol-7-sulphonic acid and $R_6$ represents a coupled amino naphthol sulphonic acid of the type

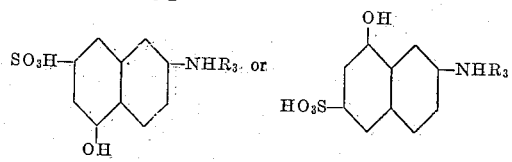

wherein $R_3$ represents hydrogen, an acyl group, or a monocyclic aryl group.

7. New azo dyes having the probable general formula

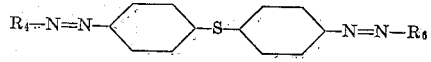

wherein $R_4$ represents a coupled 2-amino-5-naphthol-7-sulphonic acid and $R_6$ represents a coupled amino naphthol sulphonic acid of the type

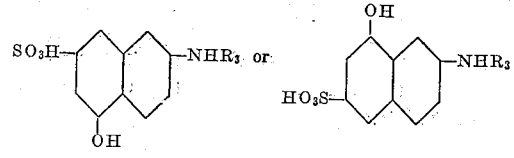

wherein $R_3$ represents hydrogen, an acyl group or monocyclic aryl group, the said dyes being soluble in concentrated sulphuric acid and in water and dyeing viscose silk in even level shades.

8. New azo dyes having the probable general formula

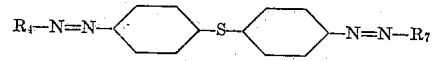

wherein $R_4$ represents a coupled 2-amino-5-naphthol-7-sulphonic acid and $R_7$ represents a coupled amino naphthol sulphonic acid of the type

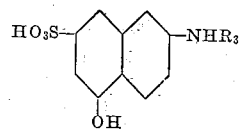

wherein $R_3$ represents hydrogen, an acyl group or monocyclic aryl group, said dyes being soluble in concentrated sulphuric acid and in water and dyeing viscose silk in even level shades.

9. New azo dyes having the probable general formula

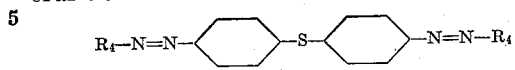

wherein $R_4$ represents a coupled 2-amino-5-naphthol-7-sulphonic acid, the amino group of which may be represented by the structure -NHR, wherein R represents hydrogen, an acyl group or a monocyclic aryl group.

10. New azo dyes having the probable general formula

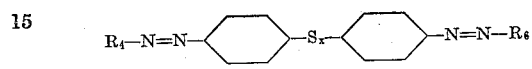

wherein $x$ is an integer greater than 0 and less than 4 and $R_4$ and $R_6$ are coupled amino naphthol sulphonic acids selected from a group consisting of the structures

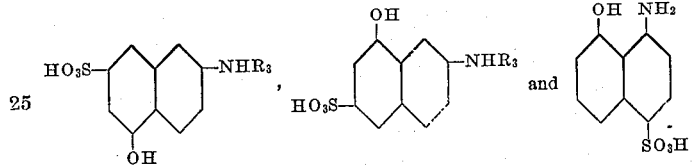

wherein $R_3$ represents hydrogen, an acyl group or a monocyclic aryl group.

11. New azo dyes having the probable general formula

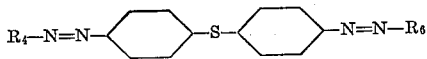

wherein $R_4$ and $R_6$ are coupled amino naphthol sulphonic acids selected from a group consisting of the structures

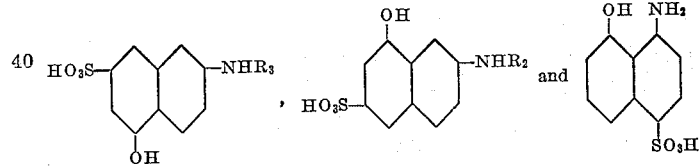

wherein $R_3$ represents hydrogen, an acyl group or a monocyclic aryl group.

12. New azo dyes having the probable general formula

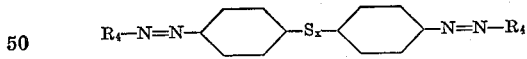

wherein $x$ is an integer greater than 0 and less than 4 and $R_4$ represents a coupled 2-amino-8-naphthol-6-sulphonic acid, the amino group of which may be represented by the structure -NHR, wherein R represents hydrogen, an acyl group or a monocyclic aryl group.

13. New azo dyes having the probable general formula

wherein $R_4$ represents a coupled 2-amino-8-naphthol-6-sulphonic acid, the amino group of which may be represented by the structure -NHR, wherein R represents hydrogen, an acyl group or a monocyclic aryl group.

14. New azo dyes having the probable general formula

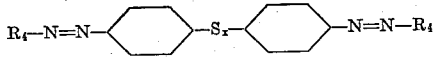

wherein $x$ is an integer greater than 0 and less than 4 and $R_4$ represents a coupled 1-amino-8-naphthol-4-sulphonic acid.

15. New azo dyes having the probable general formula

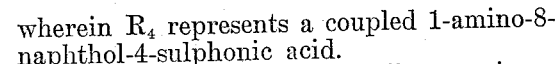

wherein $R_4$ represents a coupled 1-amino-8-naphthol-4-sulphonic acid.

In testimony whereof we affix our signatures.

RAINALD BRIGHTMAN.
PERCY CHORLEY.